United States Patent
Gramlich et al.

(10) Patent No.: US 10,538,011 B2
(45) Date of Patent: Jan. 21, 2020

(54) METHOD FOR MONITORING THE MACHINE SPACE OF A PROCESSING MACHINE, PREFERABLY A MOULDING MACHINE, AND PROCESSING MACHINE, PARTICULARLY MOULDING MACHINE, FOR CARRYING OUT SUCH A METHOD

(71) Applicant: Michael Weinig AG, Tauberbischofsheim (DE)

(72) Inventors: Rainer Gramlich, Ravenstein-Oberwittstadt (DE); Hubert Klein, Wertheim-Nassig (DE); Rainer Kurz, Igersheim (DE); Peter Martin, Tauberbischofsheim (DE); Walter Rapp, Königheim-Gissigheim (DE); Ralf Wagner, Hardheim (DE)

(73) Assignee: Michael Weinig AG, Tauberbischofsheim (DE)

( * ) Notice: Subject to any disclaimer, the term of this patent is extended or adjusted under 35 U.S.C. 154(b) by 428 days.

(21) Appl. No.: 14/928,027

(22) Filed: Oct. 30, 2015

(65) Prior Publication Data

US 2016/0121520 A1 May 5, 2016

(30) Foreign Application Priority Data

Nov. 4, 2014 (DE) .......................... 10 2014 016 628

(51) Int. Cl.
*B27C 1/08* (2006.01)
*B27C 1/12* (2006.01)
*B27C 5/06* (2006.01)

(52) U.S. Cl.
CPC .................. *B27C 1/08* (2013.01); *B27C 1/12* (2013.01); *B27C 5/06* (2013.01)

(58) Field of Classification Search
CPC . B29C 37/0096; B29C 39/24; B23Q 11/0085; B27C 1/12; B27C 1/08; B27C 5/06
See application file for complete search history.

(56) References Cited

U.S. PATENT DOCUMENTS

| 5,127,454 A | * | 7/1992 | Gemmani | ............... B23Q 3/002 144/116 |
| 5,746,644 A | * | 5/1998 | Cheetham | ................. B24B 5/18 451/11 |

(Continued)

FOREIGN PATENT DOCUMENTS

| CN | 102 126 132 | 7/2011 |
| DE | 42 37 048 C1 | 4/1994 |

(Continued)

*Primary Examiner* — Anthony Calandra
*Assistant Examiner* — Jerzi H Moreno Hernandez
(74) *Attorney, Agent, or Firm* — Gudrun E. Huckett

(57) ABSTRACT

In monitoring the machine space of a processing machine during the throughput of workpieces in order to detect workpieces that got stuck, the rear end of a workpiece with reference to the transport direction generates a start signal in the inlet region of the machine space, as well as an end signal in the outlet region thereof by sensors that are connected to a control unit. Beginning with the start signal, the control unit detects a feature that characterizes a theoretical feed travel and generates a release signal if the value of the detected characteristic feature has reached at the time, at which the end signal is generated, a predefined limiting value and not yet exceeded a predefined upper limiting value or if the end signal is generated at a time, at which the value of the detected characteristic feature has reached the predefined limiting value and not yet exceeded the upper limiting value.

16 Claims, 7 Drawing Sheets

(56) References Cited

U.S. PATENT DOCUMENTS

| | | | | |
|---|---|---|---|---|
| 6,247,511 B1 * | 6/2001 | Maeda | ............... | B27C 1/04 |
| | | | | 144/117.1 |
| 9,874,864 B2 * | 1/2018 | Konrad | ............... | B27C 1/08 |
| 2002/0044308 A1 * | 4/2002 | Sekiya | ............... | B65H 7/14 |
| | | | | 358/509 |
| 2014/0042692 A1 * | 2/2014 | Matsumoto | ............ | B65H 7/02 |
| | | | | 271/265.03 |
| 2015/0142167 A1 | 5/2015 | Konrad et al. | | |
| 2015/0378301 A1 * | 12/2015 | Nakamura | ............ | G03G 15/70 |
| | | | | 399/21 |

FOREIGN PATENT DOCUMENTS

| | | | |
|---|---|---|---|
| DE | 196 16 165 | | 10/1997 |
| DE | 197 41 163 | | 4/1999 |
| DE | 19741163 A1 * | | 4/1999 |
| DE | 197 56 503 | | 6/1999 |
| DE | 19756503 A1 * | | 6/1999 |
| DE | 10 2009 060 124 | | 6/2011 |
| DE | 102009060124 A1 * | 6/2011 | ......... B23Q 17/2428 |
| DE | 10 2012 006 124 A1 | | 9/2013 |
| GB | 1 413 106 | | 11/1975 |

\* cited by examiner

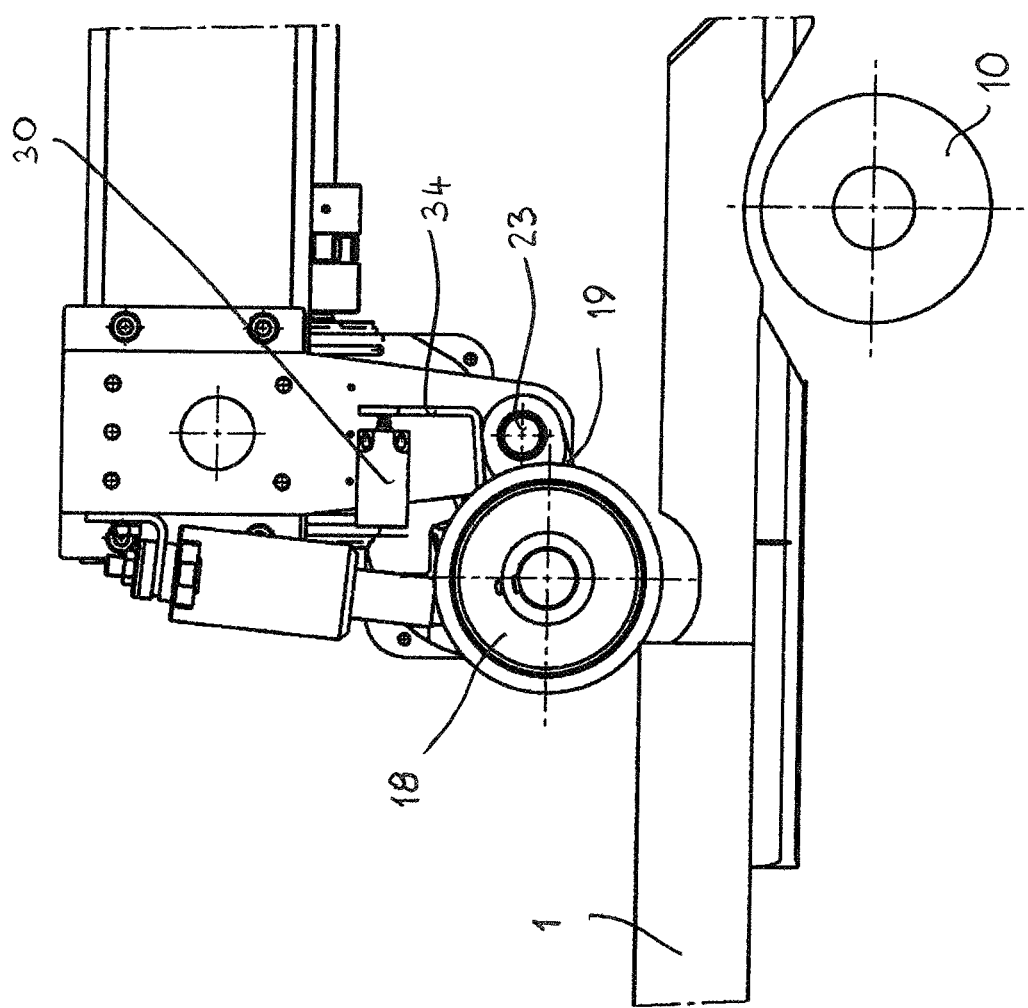

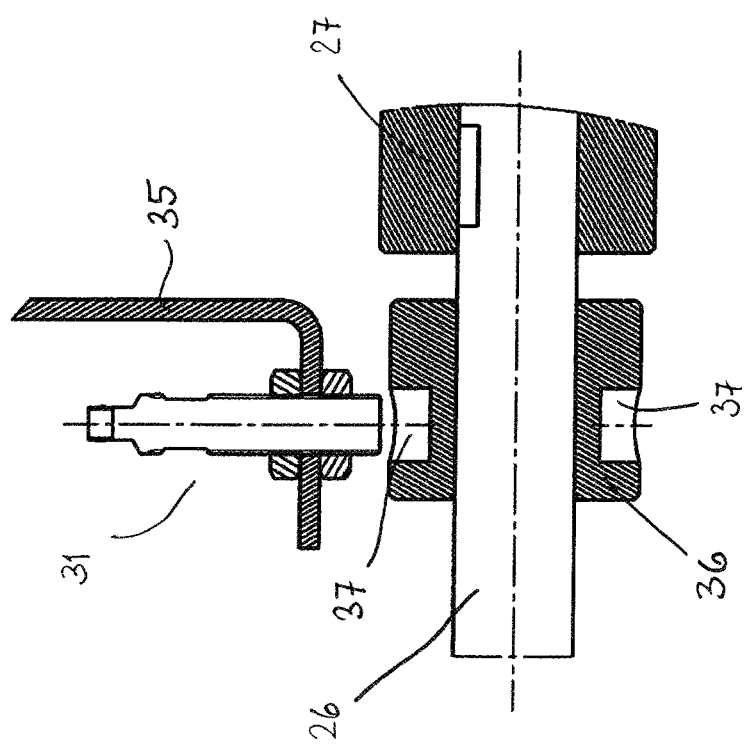

METHOD FOR MONITORING THE MACHINE SPACE OF A PROCESSING MACHINE, PREFERABLY A MOULDING MACHINE, AND PROCESSING MACHINE, PARTICULARLY MOULDING MACHINE, FOR CARRYING OUT SUCH A METHOD

BACKGROUND OF THE INVENTION

The invention relates to a method for monitoring the machine space of a processing machine, preferably a moulding machine, for workpieces that got stuck, as well as to a processing machine, particularly a moulding machine, for carrying out such a method.

It is known to process workpieces during their transport through a processing machine, particularly a moulding machine. In this case, the workpieces are guided past corresponding tools within the machine space by means of feed rollers while the tools process the workpieces on the corresponding sides, for example, in the form of a planing or profiling operation. It can occur that workpieces get stuck in the machine space. Machine damages can occur, in particular, when tools are adjusted into a new or different position while workpieces are located within collision range of these tools. If workpieces are still located in the machine space when the feed rollers are raised, they can be thrown back due to the engagement with tools that are still running because the workpieces are no longer captured and held by the feed rollers once they are raised.

The invention therefore is based on the object of designing the initially cited method and the initially cited processing machine in such a way that workpieces, which may have got stuck in the machine space, can be reliably detected.

SUMMARY OF THE INVENTION

According to the invention, this object is solved for the method of the aforementioned kind in that the rear end of a workpiece with reference to the transport direction generates during the throughput of the workpiece through the machine space a start signal in the inlet region of the machine space, as well as an end signal in the outlet region thereof, by means of sensors that are connected to a control unit, and in that the control unit detects beginning with the start signal a feature that characterizes a theoretical feed travel and generates a release signal if the value of the detected characteristic feature has at the time, at which the end signal is generated, reached a predefined limiting value and preferably not yet exceeded a predefined upper limiting value or if the end signal is generated at a time, at which the value of the detected characteristic feature has reached the predefined limiting value and preferably not yet exceeded the upper limiting value.

In regard to the processing machine of the aforementioned kind this object is solved in that a first sensor is arranged in the inlet region of the processing machine and detects the rear end of the workpiece with reference to the transport direction of the workpiece, and in that a second sensor is arranged in the outlet region of the processing machine and detects the rear end of the workpiece with reference to the transport direction after the workpiece has been transported by a certain feed travel.

In the inventive method, the workpiece entering the machine space of the processing machine generates a start signal in the inlet region with its rear end with reference to the transport direction. If the workpiece properly passes through the machine space, its rear end generates an end signal in the outlet region of the machine space. The signals are fed to a control unit, to which the signal-generating sensors are connected. As soon as the rear end of the workpiece has generated the start signal, a feature characterizing the theoretical feed distance is detected and fed to the control unit. When the rear end of the workpiece generates the end signal, the control unit checks whether the value of the measured characteristic feature has reached a predefined limiting value, preferably not yet exceeded a predefined upper limiting value. If this is the case, the control unit generates a release signal and thereby indicates that no workpieces got stuck in the machine space. The control unit may alternatively also monitor whether the end signal is generated by the rear end of the workpiece at a time, at which the value of the characteristic feature detected by the control unit has reached the predefined limiting value and preferably not yet exceeded the upper limiting value. If this is the case, the control unit generates the release signal and thereby indicates that the workpieces have properly passed through the machine space. The limiting value is determined from the constructively predefined feed distance or a feature characterizing this feed distance, wherein the limiting value and the upper limiting value differ by a potential tolerance.

The length of the workpiece itself is irrelevant because the rear end of the workpiece with reference to the transport direction is used for triggering the signals. This is the reason why the term workpiece should not only be interpreted as one individual workpiece, but also a workpiece string consisting of two or more abutting workpieces. In this case, the rear end of this workpiece string forms the reference parameter that generates the start signal and the end signal. This makes it possible to determine whether a workpiece got stuck during its transport through the processing machine in a constructively simple and reliable fashion.

If no end signal is generated by a workpiece, it got stuck during its transport from the inlet to the outlet of the processing machine. The control unit also generates no release signal in this case.

When a workpiece entering the machine space of the processing machine generates the start signal with its rear end, the theoretical feed distance of the workpiece is in an advantageous embodiment derived from the rotation of a driveshaft for a transport element of the processing machine. For example, the number of revolutions of the driveshaft can be detected with corresponding sensors or a rotary encoder and fed to the control unit. The count of the revolutions of the driveshaft is a measure for the theoretical feed distance traveled by the workpiece during its proper and undisturbed transport through the machine space. As soon as this theoretical feed distance, which was determined based on the number of revolutions of the driveshaft, has reached the value of the feed distance that is constructively predefined by the workpiece positions, at which the start and end signal are generated, the control unit expects the end signal to be triggered by the rear end of the workpiece.

In another embodiment, the characteristic feature is the feed distance itself. Since one revolution of the driveshaft corresponds to a certain feed distance of the workpiece, the number of revolutions of the driveshaft is controllably directly converted into a feed distance that is fed to the control unit. The control unit compares the detected theoretical feed distance of the workpiece with the constructively predefined feed distance. The control unit expects the end signal as soon as the detected theoretical feed value has reached the constructively predefined feed distance.

It is ultimately also possible that the control unit monitors a time window defined by the time interval between the start signal and the end signal. Since the constructively predefined feed distance is known to the control unit, the time frame, within which the end signal must be generated after the generation of the start signal, can be determined from the feed rate. The feed rate can be derived, for example, from the rotational speed of the driveshaft, but also directly from a frequency converter for the feed drive. If the end signal is not generated within the time window, in which a tolerance range is taken into consideration due to potential slip, the control unit therefore does not generate the release signal because the workpiece obviously got stuck within the machine space.

The generation of the release signal by the control unit advantageously authorizes certain operations of the processing machine. In the described instances, in which no end signal is generated in a timely fashion, a corresponding message can be output by the control unit.

In addition, the control unit may also generate an acoustical and/or optical signal in order to inform the operating personnel of the fact that a workpiece got stuck in the machine space.

In an advantageous embodiment, the signals characterizing the theoretical feed distance of the workpiece in the machine space are compared with signals of a frequency converter of a feed motor of the processing machine in the control unit. This comparison may serve for confirming that the characterizing signals are determined and transmitted without interference.

In the inventive processing machine, a first sensor is arranged in the inlet region into the machine space. This first sensor detects the rear end of the workpiece with reference to the transport direction. A second sensor is provided in the outlet region of the machine space of the processing machine and detects the rear end of the workpiece with reference to the transport direction after the workpiece has traveled a feed distance.

The processing machine is advantageously furthermore provided with a third sensor for detecting the theoretical feed distance of the workpiece.

The feed elements advantageously are feed rollers that are mounted on feed rockers. They are realized in the form of single-armed levers that can be pivoted about an axis extending transverse to the transport direction of the workpieces through the processing machine.

The pivoting motion of the feed rockers of respective feed rollers on the inlet side and on the outlet side is preferably used for generating the start signal and the end signal.

It is advantageous to respectively provide a sensor for detecting the pivoting motion of the feed rockers of the respective feed rollers on the inlet side and on the outlet side.

In an advantageous embodiment, the sensor is a Reed switch.

In another advantageous embodiment, the sensor is a limit switch.

The limit switch is advantageously arranged rigidly with reference to the machine and cooperates with a switching element. The switching element is arranged on the feed rocker of the feed roller and cooperates with the limit switch due to the pivoting motion of the feed rocker.

The third sensor for detecting the theoretical feed distance of the workpiece through the machine space preferably is an inductive sensor. A rotary encoder can also be used for detecting the feed distance of the workpiece. The rotary encoder or the inductive sensor detects the number of revolutions of a corresponding driveshaft for the transport elements. For example, two signals are generated per revolution of the driveshaft. One complete revolution of the driveshaft corresponds to a certain theoretical feed distance of the workpiece. The theoretical feed distance of the workpiece therefore can be derived from the number of signals.

The third sensor advantageously cooperates with a switching ring that is seated on a shaft of the feed drive in a rotationally rigid fashion. The switching ring is designed in such a way that it generates one, two or more switching pulses per revolution. Each pulse corresponds to a certain theoretical feed distance of the workpiece. The corresponding theoretical feed distance of the workpiece therefore can be determined from the number of pulses.

When the workpiece is transported into the machine space of the processing machine, its front end with reference to the transport direction comes in contact with the respective feed rollers. These feed rollers are initially in a home position, from which they are raised by the front end of the workpiece. During this process, the respective feed rocker carrying the feed rollers is pivoted upward.

The first sensor in the region of the feed roller on the inlet side is switched off when this feed roller is raised.

As soon as the workpiece has been transported so far that it exits the feed roller on the inlet side, this feed roller once again returns into the home position such that the associated feed rocker is pivoted downward. As a result, the first sensor is switched on and therefore generates the start signal.

Monitoring by means of the third sensor advantageously starts when the feed roller on the inlet side is lowered, at which time the third sensor begins to detect the theoretical feed distance of the workpiece.

In an advantageous embodiment, the first sensor is switched off and the monitoring process is initialized anew or the detection is reset every time the feed roller on the inlet side is raised.

When the workpiece reaches the region of the feed roller on the outlet side, this feed roller is raised from its home position such that the associated feed rocker pivots upward.

Once the rear end of the workpiece is released from this feed roller on the outlet side, the associated feed rocker of the feed roller on the outlet side pivots downward. As a result, the second sensor is switched on and subsequently transmits the end signal to the control unit.

The invention is not only defined by the subject matter of the individual claims, but also by all information and features disclosed in the drawings and the description. Even if they are not subject matter of the claims, they are claimed as being essential to the invention insofar as they are novel in comparison with the prior art individually or in combination.

Other features of the invention result from the other claims, the description and the drawings.

BRIEF DESCRIPTION OF THE DRAWINGS

The invention is described in greater detail below with reference to an exemplary embodiment that is illustrated in the drawings.

FIGS. 3 to 6 respectively show the sequence of the detection of the throughput of workpieces through the processing machine in the form of an enlarged detail.

FIG. 7 shows a sensor arrangement for detecting the revolutions of the feed drive in the form of an enlarged and sectioned detail.

DESCRIPTION OF PREFERRED EMBODIMENTS

Figure 1:
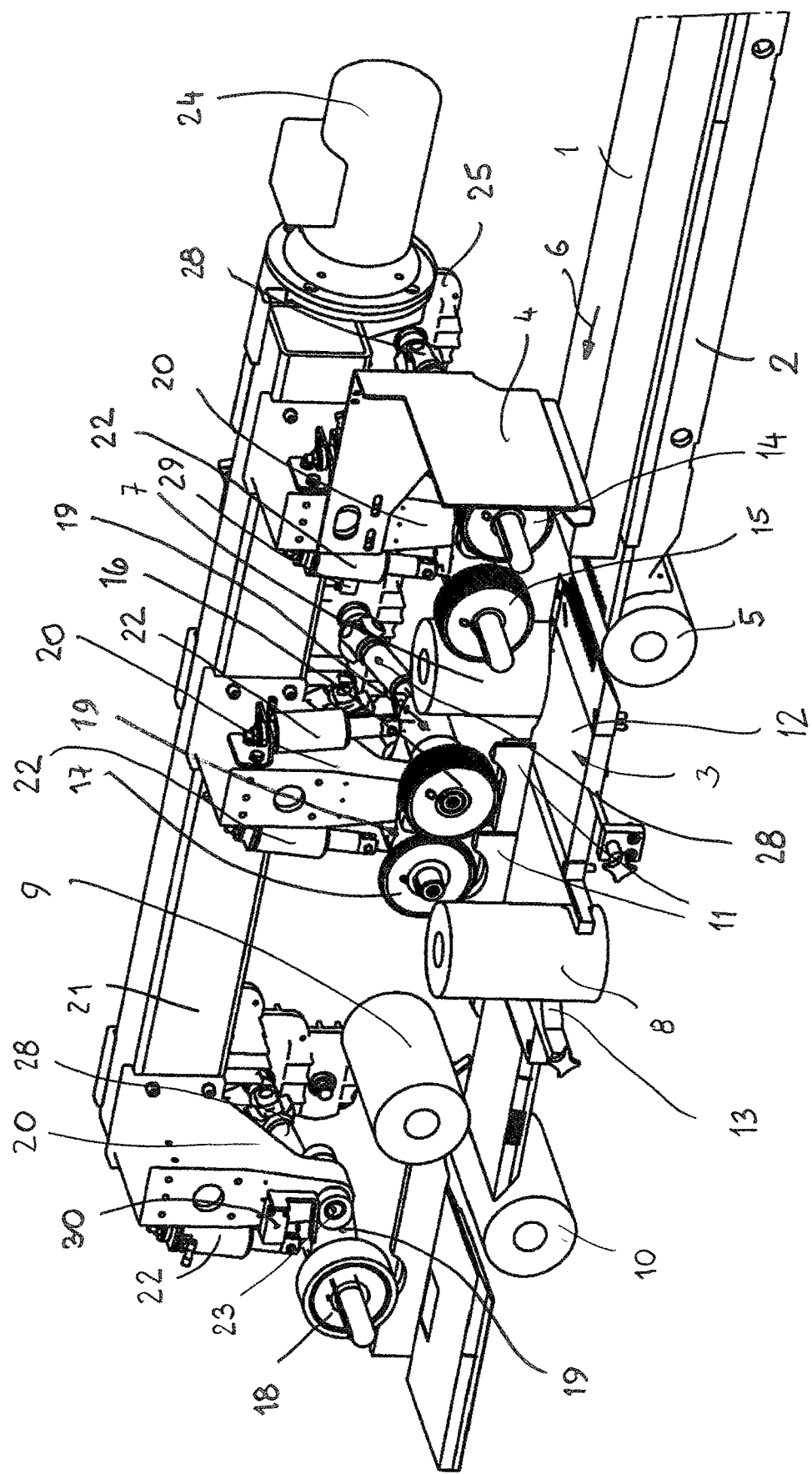
FIG. 1 shows a perspective view of an inventive processing machine in the form of a moulding machine.

The processing machine advantageously consists of a moulding machine, by means of which elongate workpieces 1 of wood can be processed on four sides while they pass through the processing machine. The workpieces 1 are supplied via a straightening table 2 and transported on a machine table 3 during processing in the moulding machine. The workpieces 1 are processed with tools while they travel through the moulding machine. A lower dressing spindle 5, which is rotatable about a horizontal axis, is located in the inlet region of the workpieces 1 behind an infeed flap 4. The tool positioned on the dressing spindle 5 serves for processing the underside of the workpiece 1. The moulding machine is provided with a right spindle 7, which is rotatable about a vertical axis, behind the dressing spindle 5 with reference to the transport direction 6 of the workpieces 1. The tool positioned on the spindle 7 serves for processing the right longitudinal side of the workpiece 1 viewed in the transport direction 6. The moulding machine is also provided with a left spindle 8, which is rotatable about a vertical axis and arranged behind the right spindle 7 with reference to the transport direction 6 of the workpiece 1. The tool positioned on the spindle 8 serves for processing the left longitudinal side of the workpiece 1 viewed in the transport direction 6. The moulding machine additionally has an upper spindle 9, which is rotatable about a horizontal axis and arranged behind the left spindle 8 with reference to the transport direction 6 of the workpiece 1. The tool positioned on the spindle 9 serves for processing the upper side of the workpiece 1 while it travels through the moulding machine. The moulding machine furthermore has another lower spindle 10, which is rotatable about a horizontal axis and arranged behind the upper spindle 9 with reference to the transport direction 6. The tool positioned on the spindle 10 serves for once again processing the underside of the workpiece 1 while it travels through the moulding machine.

The machine table 3 is conventionally interrupted in the region of the two lower spindles 5, 10 such that the tools positioned on the spindles can process the underside of the workpiece 1.

While passing through the moulding machine, the workpiece 1 contacts stops 11 with its right longitudinal side viewed in the transport direction 6.

Table panels 12, 13, which can be displaced transverse to the transport direction 6, are respectively assigned to the two vertical spindles 7, 8 in order to realize their cutting diameter.

Feed rollers 14 to 18 are provided for transporting the workpiece 1 through the moulding machine, wherein said feed rollers rest on the upper side of the workpiece 1 and transport the workpiece through the moulding machine in the transport direction 6. The feed rollers 14 to 18 are respectively mounted on feed rockers 19 that are pivotably mounted on rocker brackets 20. They are fastened on a transport beam 21 that extends in the transport direction 6 a certain distance above the machine table 3. The rocker brackets 20 are detachably fastened on the transport beam 21.

The feed rollers 14 to 18 are pressed against the upper side of the workpiece 1 with the aid of pressure cylinders 22, preferably pneumatic cylinders. The pressure cylinders 22 are mounted on the rocker brackets 20 and engage on the feed rockers 19.

The feed rockers 19 are single-armed levers, one end of which is pivotably mounted on a horizontal axis 23. The pressure cylinders 22 form so-called pneumatic pressure elements and engage on the free ends of the feed rockers 19.

A feed motor 24 serves for driving the transport rollers, wherein said feed motor drives feed shafts 26 that are drive connected to one another by means of clutches 27 and in turn drive feed gear mechanisms 25. The transport rollers 14 to 18 are drive connected to the output sides of the feed gear mechanisms 25 by means of cardan shafts 28.

A sensor 29, which is a Reed switch in the exemplary embodiment, is provided on the pressure cylinder 22 of the feed roller 15. This sensor detects whether or not the transport roller 15 rests on the workpiece 1 to be transported because the transport roller is raised in the first case and lowered into the home position in the second case.

An additional sensor 30 is assigned to the transport roller 18, which is located behind the spindle 10 with reference to the transport direction 6, and likewise makes it possible to detect whether the transport roller 18 is lowered or raised.

An additional sensor 31 detects the revolution of the feed shafts 26, wherein the feed rate and the theoretical feed distance of the workpiece 1 in the moulding machine are determined based on the detected revolutions of the feed shafts. All three sensors 29 to 31 are connected to a control unit 32. The feed motor 24 is driven with a not-shown frequency converter, by means of which the feed rate is adjusted. The frequency converter is connected to the terminal box 33 of the feed motor 24 and to the control unit 32. This connection is symbolically illustrated with the broken line 33' in FIG. 2. The current feed rate of the feed motor 24 is adjusted with the frequency converter and transmitted to the control unit. The sensor 32 transmits switching pulses to the control unit 32, wherein the feed rate is likewise determined based on said switching pulses. The thusly determined feed rate is compared with the feed rate read out by the frequency converter 33 in the control unit 32. This serves for checking whether the sensor 31 operates and functions correctly, which would not be the case, e.g., if it is defective or incorrectly adjusted. If applicable, the control unit 32 outputs an error message.

Figure 2:
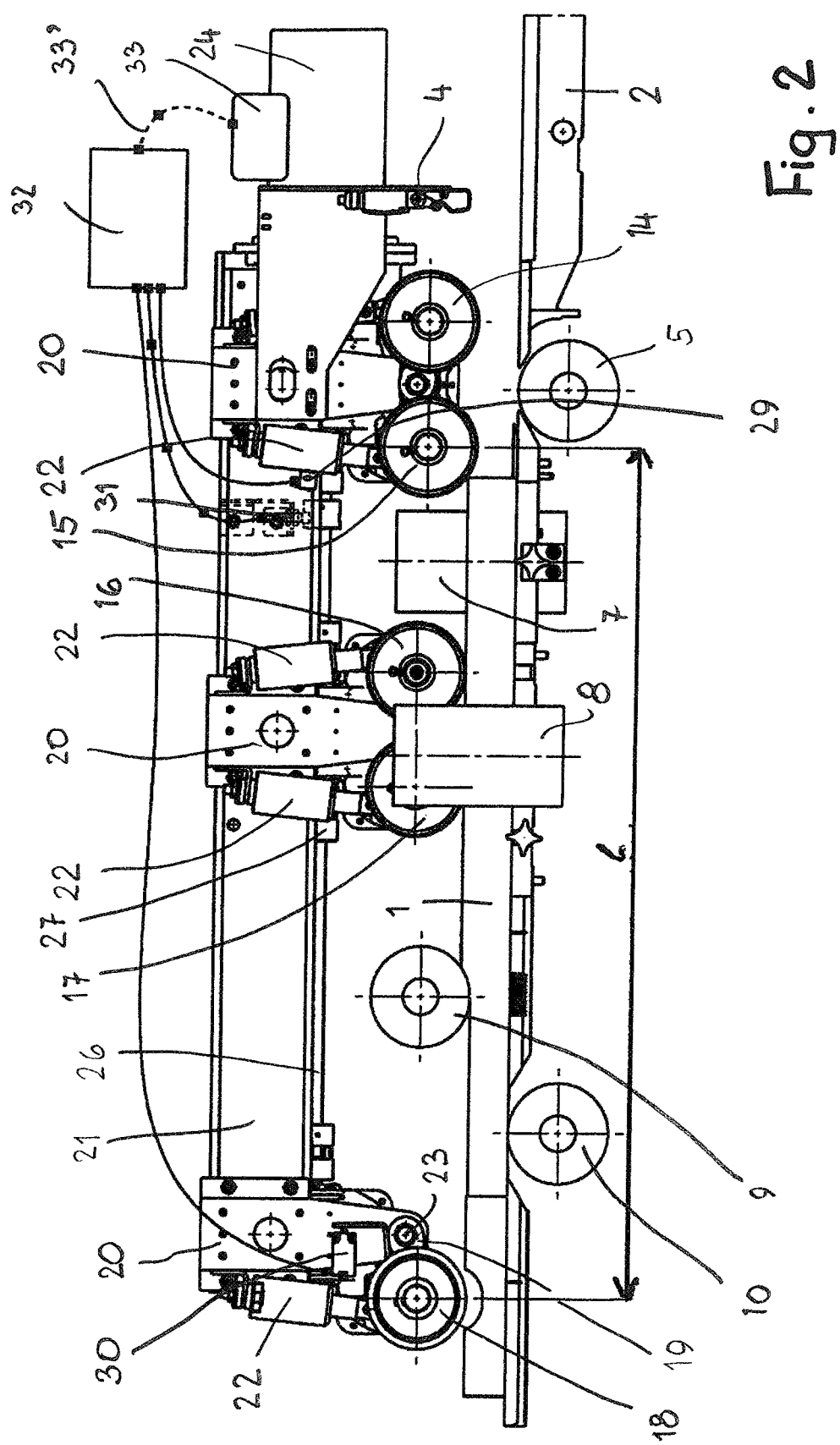
FIG. 2 shows a side view of the processing machine according to FIG. 1.

In the illustration according to FIG. 1, the workpiece 1 is in the process of entering the moulding machine. The front end of the workpiece 1 with reference to the transport direction 6 already has entered the moulding machine underneath the infeed flap 4. As soon as the workpiece 1 reaches the region of the feed rollers 14 to 18, it is transported through the moulding machine by these feed rollers. During this process, the feed rollers are pressed against the upper side of the workpiece 1 with sufficient pressure by means of the pressure cylinders 22. The workpiece is processed with tools positioned on the spindles 7 to 10 while it travels through the moulding machine. FIG. 2 shows that material on the upper side of the workpiece 1 is removed with the tool positioned on the spindle 9.

Figure 3:
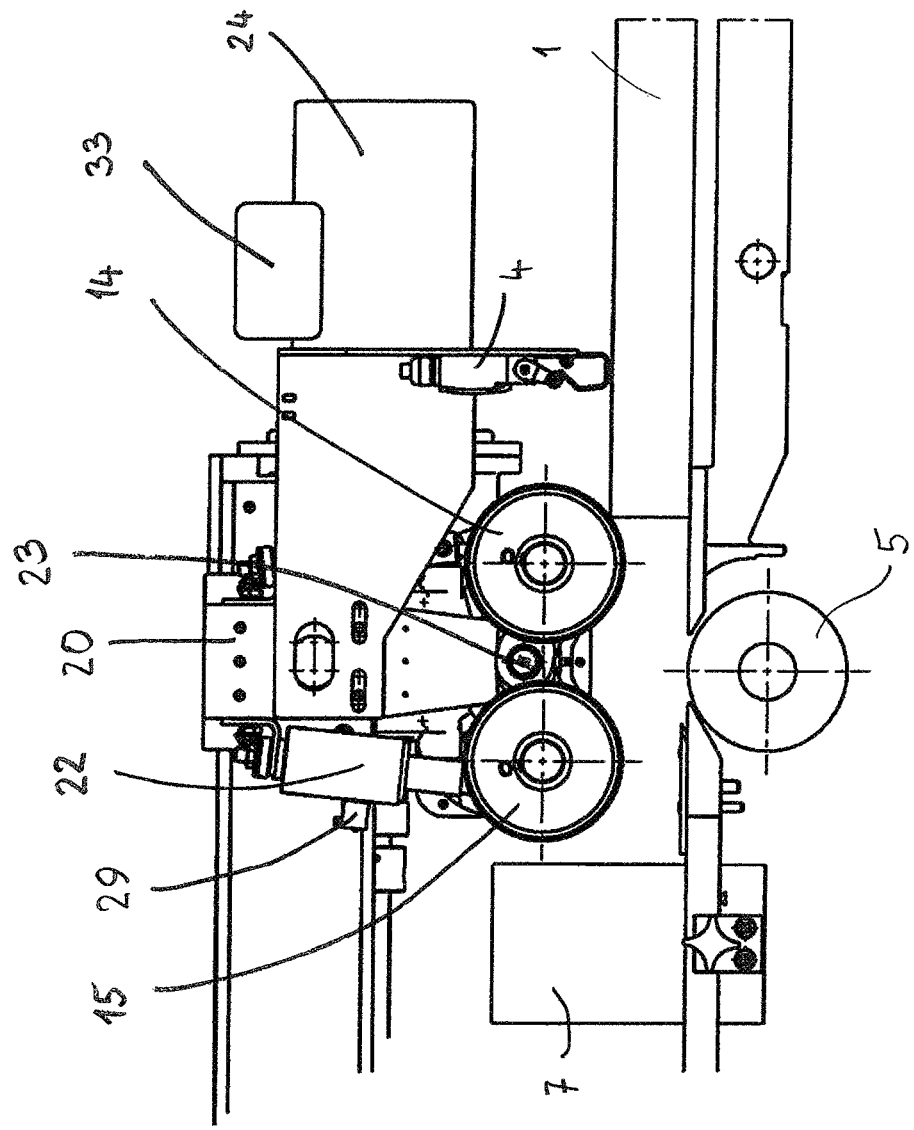
Figure 4:
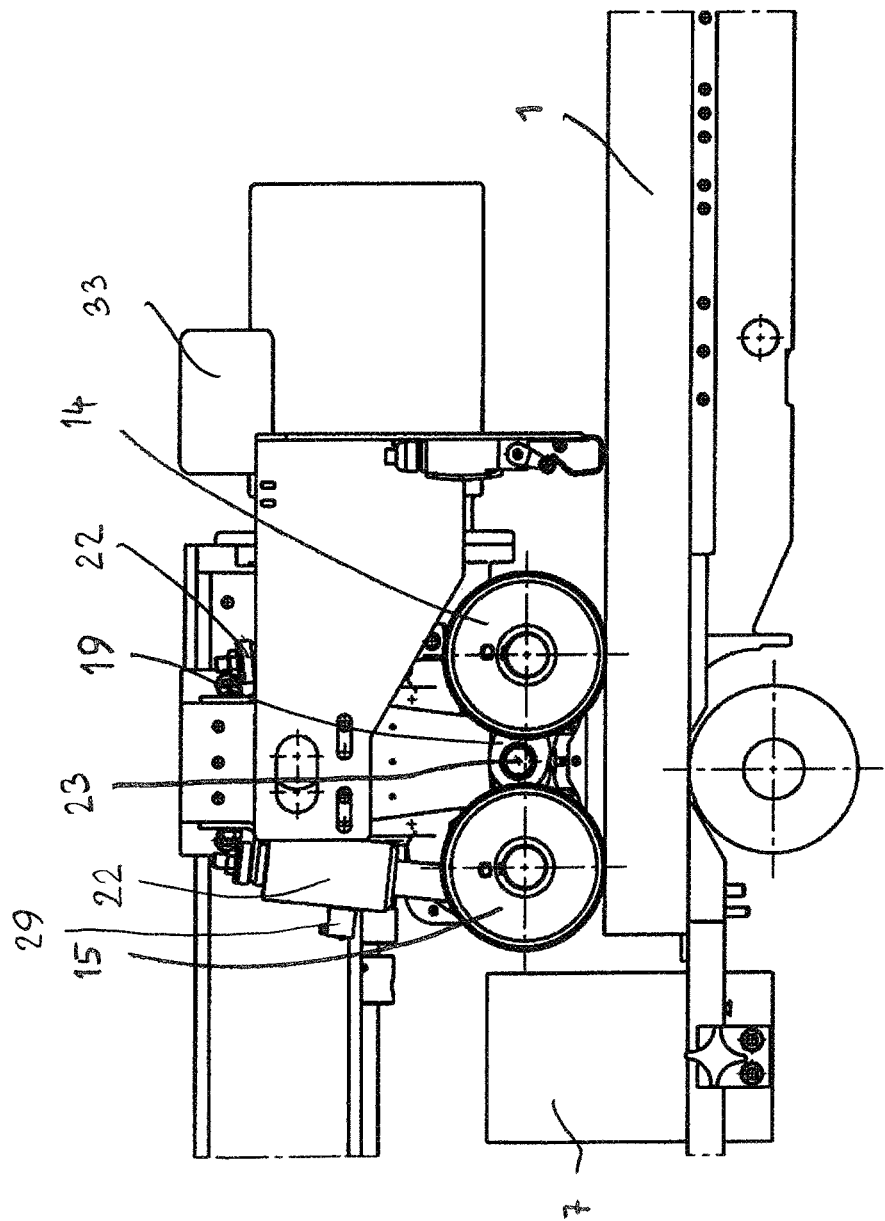

The feed rollers 14 to 18 assume a lower position as long as the workpiece 1 has not yet entered the moulding machine. In FIG. 3, the two feed rollers 14, 15 are in this lowered home position. The sensor 29 is switched in the home position. The sensor 29 is assigned to the second feed roller 15 with reference to the infeed direction because the first feed roller 14 may, if so required, be tilted upward, for example, when exact straightening of the workpiece 1 is required. When the front end of the workpiece 1 with reference to the transport direction 6 reaches the feed rollers 14, 15, said feed rollers are raised in that the feed rockers 19 are pivoted upward about the common axis 23. This position of the feed rollers 14, 15 is illustrated in FIG. 4. The workpiece 1 has been transported into the moulding machine so far that it is positioned underneath both feed rollers 14, 15. The associated feed rockers 19 are pivoted upward about the common axis 23. The pressure cylinders 22 press the feed rollers 14, 15 against the upper side of the workpiece 1 by means of the feed rockers 19. A piston rod of the pressure cylinder 22 is retracted by pivoting the feed rocker 19 of the feed roller 15 upward. The Reed sensor 29 is switched by a magnetic piston of the piston rod when the feed rocker 19 is in the home position. The sensor 29 is switched off when the magnetic piston moves out of the detection range of the sensor 29 during the retraction of the piston rod.

As soon as the rear end of the workpiece 1 with reference to the transport direction 6 has passed underneath the feed roller 15, the feed rocker 19 of this feed roller 15 once again pivots back into the home position due to the extension of the piston rod of the pressure cylinder 22. The sensor 29 is now once again switched on by the magnetic piston.

Figure 5:
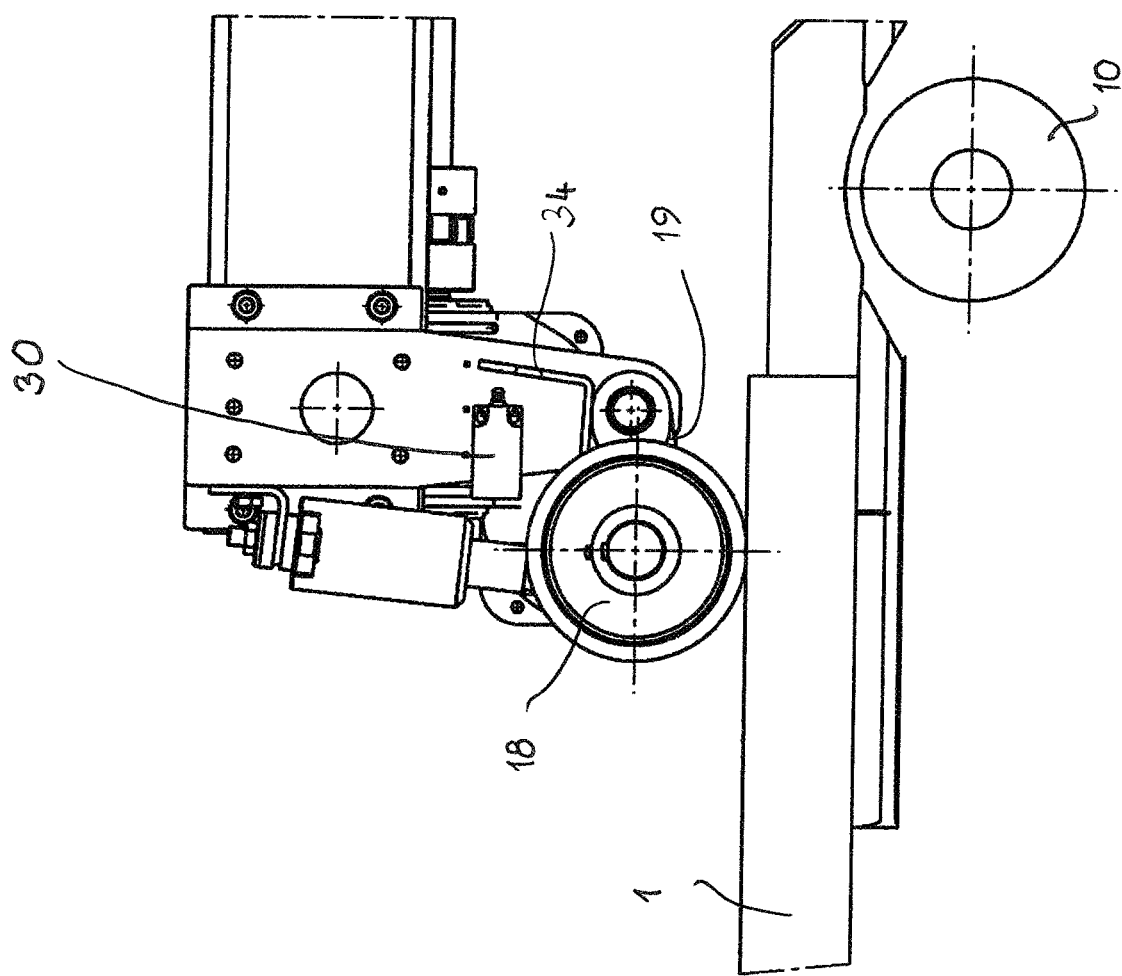

FIG. 5 shows the situation, in which the workpiece 1 is still located underneath the last feed roller 18, which accordingly is raised with the aid of the feed rocker 19. The sensor 30 is realized in the form of a limit switch that cooperates with a switching element 34. It has an angular design and is fastened on the feed rocker 19. As long as the feed roller 18 is in the raised position, the switching element 34 is spaced apart from the sensor 30 such that it is not switched.

During the further transport, the workpiece 1 is released from the feed roller 18 (FIG. 6). The feed rocker 19 can then pivot about the axis 23 downward into the home position (in the counterclockwise direction). The switching element 34 pivots about the axis 23 together with the feed rocker such that it comes in contact with, actuates and thereby once again switches the sensor 30. The sensor 30 transmits a corresponding signal defining the time, at which the monitoring process ends, to the control unit 32.

Consequently, the workpiece end is always decisive for the monitoring process, i.e. when the workpiece exits the inlet feed roller 15 and the outlet feed roller 18.

FIG. 7 shows the design of the sensor 31, by means of which the theoretical feed distance of the workpiece 1 is detected based on the revolution of the feed shafts 26. The actual feed distance of the workpiece 1 may deviate from this theoretical feed distance, for example, because slippage of the feed rollers may occur. The sensor 31 is an inductive sensor or an inductive switch that is fastened on a sensor bracket 35. It is fastened on the transport beam 31. The sensor 31 lies opposite of a switching ring 36 that is seated in a rotationally rigid fashion on the feed shaft 26 extending between feed gear mechanisms. The connection between the feed shafts 26 is produced by means of the schematically illustrated clutch 27.

On its circumference, the switching ring 36 has two diametrically opposite recesses 37 that generate two switching pulses during a 360° revolution of the switching ring 36. The sensor 31 therefore transmits two switching pulses to the control unit 32 per revolution. The feed shaft 26 has a rotational speed that corresponds to the motor speed.

The number of revolutions of the switching ring 36 corresponds to the number of revolutions of the feed motor 24. The number of revolutions of the feed rollers 14 to 18 can be determined based on the transmission ratio of the feed gear mechanisms 25. The theoretical feed distance of the workpiece 1 through the moulding machine can be determined in connection with the diameter and therefore the circumference of the feed rollers 14 to 18.

Each switching pulse corresponds to a theoretical feed distance that is calculated based on the transmission ratio and the circumference of the feed rollers.

The feed roller 15 assigned to the sensor 29 and the feed roller 18 assigned to the sensor 30, which is located at the outlet of the moulding machine, are spaced apart from one another by the constructively predefined fixed distance I (FIG. 2). The constructively predefined feed distance, which the end of each workpiece has to travel between exiting the inlet feed roller and exiting the outlet feed roller, results from the workpiece positions, at which the start signal and the end signal are generated. If the workpiece passes through the machine in a proper and undisturbed fashion, the travel of the workpiece over this feed distance corresponds to a certain number of revolutions of the feed rollers and of the feed shafts, as well as to a certain number of pulses of the sensor 31.

The control unit 32 evaluates the signals of the sensors 29 and 30. The sensor 29 is switched off as soon as the feed roller 15 is raised by the workpiece. Due to this switch-off signal, the monitoring process yet to be described is initialized anew every time the feed roller 15 is pivoted upward by a new workpiece being introduced into the processing machine.

As soon as the rear end of the workpiece 1 with reference to the transport direction 6 has exited the feed roller 15, it pivots back into the home position such that the sensor 29 is switched. The control unit 32 thereby receives a start signal defining the beginning of the monitoring process from the sensor 29.

The control unit 32 now begins to count the pulses of the sensor 31 and to add up the calculated theoretical feed distance per pulse stored in the control unit for each pulse. The monitoring process is initialized anew and the counter is set to zero every time the sensor 29 transmits the switch-off pulse to the control unit when a new workpiece is introduced. The counter initially may also be set to zero by the start signal during the exit of the workpiece rather than by the switch-off pulse during the introduction of the workpiece. Every time a workpiece 1 has exited the feed roller 18 with its rear end, i.e. when the feed roller 18 is once again lowered into the home position and the sensor 30 is switched, the control unit checks whether the value for the theoretical feed distance determined by adding up the pulses of the sensor corresponds to the constructively predefined feed distance. If the workpieces pass through the machine in an undisturbed fashion, the actually traveled feed distance corresponds to the theoretical feed distance within a certain tolerance. This tolerance may result from the actual effective circumference or diameter of the feed rollers deviating from the theoretical circumference or diameter used in the calculation and the feed rollers may have reduced slippage. In practical applications, it is impossible to monitor whether the calculated value exactly corresponds to the constructively predefined feed value such that limiting values have to be defined instead. It furthermore must be taken into consideration that the switching of the sensors 29, 30 during the exit of the workpiece, as well as the exiting of the feed rollers itself, is also subject to tolerances. As described above, the control unit 32 adds up the certain theoretical feed distance per pulse beginning with the start signal. The control unit now monitors whether the end signal is generated within the stored distance window (limiting values), i.e. within the predefined distance tolerance. A release signal is only generated if this is the case, wherein said release signal is once again canceled with each new initialization by a newly introduced workpiece. The generation of the release signal does not take place if no end signal is generated within the distance tolerance.

This may be the case if the workpiece did not pass through the machine in an undisturbed fashion and got temporarily or completely stuck. In this case, the end signal is only generated by the sensor 30 after the distance tolerance, i.e. the added up distance, is already exceeded or no signal is generated at all. If the last workpiece remains in the machine, the last end signal may also be the signal of the sensor 30 that was generated by the next-to-last workpiece with its rear end upon exiting the feed roller 18 on the outlet side. However, this takes place at a time, at which the feed distance added up by the control unit has not yet reached the lower tolerance limit (distance I–tolerance).

In an alternative monitoring evaluation, the control unit checks whether the theoretical feed distance determined by the sensor 31 in the time interval between the signals delivered by the sensors 29, 30 lies within the predefined distance window, i.e. within the distance tolerance, resulting from the constructively predefined distance I and a predefined tolerance. In other words, the evaluation in this case takes place at the time, at which the end signal is generated, whereas the previously described evaluation monitors whether an end signal is generated within the predefined distance window.

In another monitoring evaluation, only the fact that the theoretical feed distance detected after the start signal has exceeded a predefined limiting value at the time, at which the end signal is generated, or the fact that the end signal is only generated once the detected theoretical feed distance has exceeded the limiting value is used as release criterion. The limiting value is determined from the constructively predefined feed distance I with consideration of a required tolerance.

This monitoring evaluation also reliably determines whether a workpiece is still located in the machine. It may occur that no end signal at all is generated after the start signal because the workpiece got stuck in the machine. However, it may also occur that the last workpiece, which has triggered the start signal, got stuck in the machine and the end signal is generated by the preceding workpiece. In such instances, this end signal is generated at a time, at which the limiting value is not yet reached because this workpiece no longer has to travel the entire feed distance after the start signal. This may occur if the workpieces are transported through the machine in an abutting fashion or if the last workpiece is short in comparison with the feed distance and the preceding workpiece has not yet exited the outlet feed roller when the last workpiece exits the inlet feed roller and thereby generates the start signal.

If the last workpiece briefly gets stuck or is transported with substantial slippage, the end signal is indeed generated very late, i.e. at a detected theoretical feed distance that may lie far beyond the limiting value, but the workpiece nevertheless has exited the machine such that this monitoring evaluation also reliably detects and ensures that no workpieces is any longer located in the machine.

However, an upper limiting value is preferably also used in the monitoring evaluation, i.e. the end signal must be generated within a distance window defined by the upper and the lower limiting value as described above in order to generate the release signal. In this case, a release signal therefore is only generated if the workpiece has properly traveled through the machine and did not even briefly get stuck. In this case, the lower limiting value corresponds to the one limiting value in the above-described monitoring evaluation.

The control unit can output corresponding messages and either authorize certain machine operations or not depending on whether a release signal is generated or not. Particularly the positioning of the spindles 5, 7 to 10 is only authorized when the machine is empty such that no collisions with a workpiece still located in the machine can occur. An upward adjustment of the transport beam 21 is prohibited for safety reasons if the spindles 5, 7 to 10 are still running and workpieces could still be located in the machine because these workpieces are released from the feed rollers when the transport beam 21 is raised and therefore no longer held such that they may be thrown back due to the engagement with the running tools. The release signal can also be used for this purpose and this adjustment can be authorized because it is detected whether the machine is empty. If so required, a not-shown inlet gate can be additionally closed if such an adjustment should be carried out.

Such a not-shown inlet gate could generally also be controlled by means of the sensor 29, wherein said inlet gate is always closed when the workpiece end of the passing workpiece has exited the sensor 29 and no new workpiece is introduced. Opening of this inlet gate in order to introduce workpieces may be initiated, for example, by means of an additional not-shown sensor at the inlet of the moulding machine.

For example, the control unit 32 may also generate an optical and/or an acoustical signal in order to inform the operating personnel of the fact that a workpiece 1 got stuck in the moulding machine or that the moulding machine is empty.

Since the rear end of the workpiece 1 is always used for triggering the sensors 29, 30 in the moulding machine, the length of the workpieces 1 being transported through the moulding machine is irrelevant. Several workpieces can also be transported in the moulding machine in an abutting fashion. In this case, the rear end of the last workpiece with reference to the transport direction 6 is decisive for the monitoring process when it exits the feed roller 15 on the inlet side, as well as the feed roller 18 on the outlet side.

In the exemplary embodiment, the sensors 29 and 30 are respectively actuated and switched on in the home position of the feed rollers 15, 18. However, it would respectively also be possible that the sensors are switched off during the actuation and that the sensors are not actuated in the home position. Reed sensors or limit or position switches may be selectively used as sensors for both feed rollers. It is likewise possible to detect the workpiece 1 by means of light barriers or other suitable sensors.

In order to determine the theoretical feed distance, the switching ring 36 on the feed shafts 26 may also have several recesses 37 such that the resolution is increased, i.e. the feed distance per pulse is shortened, but this is not required in practical applications.

The theoretical feed distance or a value characterizing the theoretical feed distance can also be detected by means of other sensors 31 such as, e.g., a rotary encoder or at a different location, e.g. on the feed rollers themselves. It is likewise possible to directly derive this value from the frequency converter.

For example, the number of pulses of the sensor 31 may also serve as characterizing value for the theoretical feed distance. The number of pulses, which the workpiece theoretically requires for traveling the feed distance I, can be determined based on the circumference of the feed rollers, the transmission ratio of the gear mechanisms and the number of pulses per revolution such that this number of pulses serves as a predefined comparison value. In this case, a certain number of pulses also needs to be taken into consideration as tolerance in the monitoring evaluation.

In the monitoring evaluation as a function of the time, the currently adjusted feed rate can be determined from the frequency converter or the sensor 31 and the time, which the workpiece should require for traveling the feed distance I, can be determined from the currently adjusted feed rate. The actual time between the switching pulses of the sensors 29, 30 can now be directly compared with the theoretically required time, both of which must lie within a predefined tolerance if the workpieces have been properly transported through the machine. In this case, it can likewise be monitored whether an end signal is transmitted by the sensor 30 within a predefined time window that begins with the start signal of the sensor 29.

Generally speaking, the monitoring process is based on the control unit 32 comparing a feature characterizing the constructively predefined feed distance I with a feature, which is detected beginning with the start signal and characterizes the theoretical feed distance of the workpiece, at the time, at which the end signal is generated, wherein the control unit generates a release signal if the values lie within a predefined tolerance or alternatively monitors whether the end signal is generated by the sensor 30 at a time, at which the detected feature lies within predefined tolerance limits or at least above a predefined limiting value, and subsequently generates the release signal.

The specification incorporates by reference the entire disclosure of German priority document 10 2014 016 628.7 having a filing date of Nov. 4, 2014.

While specific embodiments of the invention have been shown and described in detail to illustrate the inventive principles, it will be understood that the invention may be embodied otherwise without departing from such principles.

What is claimed is:

1. A method for monitoring a machine space of a woodworking moulding machine, the method comprising:
    passing a workpiece of wood in a transport direction through the machine space from an inlet region of the machine space to an outlet region of the machine space;
    generating a start signal via a first sensor when a rear end of the workpiece of wood passes through the inlet region;
    sending the start signal to a control unit;
    generating an end signal via a second sensor when the rear end of the workpiece of wood passes through the outlet region;
    sending the end signal to the control unit;
    detecting a rotation of a driveshaft of a transport element transporting the workpiece of wood through the machine space via at least one third sensor;
    sending the detected rotation to the control unit;
    deriving a theoretical feed distance of the workpiece of wood in the machine space via the control unit based on the detected rotation and a time at which the control unit receives the start signal;
    comparing the derived theoretical feed distance of the workpiece of wood to a predefined limiting value that is based on a distance between the first and second sensors via the control unit; and
    generating a release signal via the control unit
        if the value of the theoretical feed distance, derived at a time at which the end signal is generated, has reached the predefined limiting value; or
        if the end signal is generated at the time when the derived value of the theoretical feed distance has reached the predefined limiting value.

2. The method according to claim 1, further comprising authorizing machining operations of the woodworking moulding machine with the release signal.

3. A woodworking moulding machine, comprising:
    transport elements (14 to 18) configured to transport a workpiece (1) in a transport direction (6) through a machine space of the woodworking moulding machine from an inlet region of the machine space to an outlet region of the machine space;
    a first sensor (29) arranged in the inlet region of the machine space of the woodworking moulding machine and configured to generate a start signal when the rear end of the workpiece (1), with reference to the transport direction (6) of the workpiece (1), passes through the inlet region;
    a second sensor (30) arranged in the outlet region of the machine space of the woodworking moulding machine and configured to generate an end signal when the rear end of the workpiece (1), with reference to the transport direction (6) of the workpiece (1), passes through the outlet region;
    at least one third sensor (31) configured to detect a rotation of a driveshaft (26) of one of the transport elements (14 to 18) transporting the workpiece (1) through the machine space; and
    a control unit (32),
    wherein the first sensor (29), the second sensor (30), and the at least one third sensor (31) are connected to the control unit (32); and
    wherein the control unit (32) is configured:
        to receive the start signal, the detected rotation, and the end signal;
        to derive a theoretical feed distance of the workpiece (1) in the machine space based on the detected rotation and a time at which the control unit receives the start signal;
        to compare the derived theoretical feed distance of the workpiece (1) to a predefined limiting value that is based on a distance between the first sensor (29) and the second sensor (30); and
        to generate a release signal
            if the value of the theoretical feed distance, derived at a time at which the end signal is generated, has reached the predefined limiting value; or
            if the end signal is generated at the time when the derived value of the theoretical feed distance has reached the predefined limiting value.

4. The woodworking moulding machine according to claim 3, wherein the transport elements (14 to 18) consist of feed rollers that are mounted on feed rockers (19).

5. The woodworking moulding machine according to claim 4, wherein a pivoting motion of the feed rockers (19) of respective feed rollers (15, 18) at the inlet region and at the outlet region is configured for triggering the start signal and the end signal.

6. The woodworking moulding machine according to claim 5, wherein the first sensor (29) and the second sensor (30) are configured to detect the pivoting motion of the feed rockers (19).

7. The woodworking moulding machine according to claim 3, wherein the first sensor (29) and the second sensor (30) are Reed switches.

8. The woodworking moulding machine according to claim 3, wherein the first sensor (29) and the second sensor (30) are limit switches.

9. The woodworking moulding machine according to claim 5, wherein the second sensor is a limit switch (30) that is arranged rigidly with reference to the woodworking moulding machine, and wherein the feed rocker (19) at the outlet region carries a switching element (34) that cooperates with the limit switch (30).

10. The woodworking moulding machine according to claim 3, wherein the at least one third sensor (31) is an inductive sensor or a rotary encoder.

11. The woodworking moulding machine according to claim 10, wherein the at least one third sensor (31) cooperates with a switching ring (36) that is seated on the driveshaft (26).

12. The woodworking moulding machine according to claim 6, wherein the front end of the workpiece (1), with reference to the transport direction (6), is configured to raise the feed rollers (14 to 18) and to pivot the respective feed rocker (19) upward when the front end of the workpiece (1) reaches each of the feed rollers (14 to 18).

13. The woodworking moulding machine according to claim 12, wherein the first sensor (29) is switched off when the feed roller (15) at the inlet region is raised and the second sensor (30) is switched off when the feed roller (18) at the outlet region is raised.

14. The woodworking moulding machine according to claim 12, wherein the first sensor (29) is switched on when the workpiece (1) exits the feed roller (15) and the second sensor (30) is switched on when the workpiece (1) exits the feed roller (18).

15. The woodworking moulding machine according to claim 14, wherein the detecting by the at least one third sensor (31) starts when the feed roller (15) at the inlet region is lowered.

16. The woodworking moulding machine according to claim 14, wherein the first sensor (29) is switched off and the detecting by the at least one third sensor (31) is initialized anew every time the feed roller (15) at the inlet region is raised.

* * * * *